UNITED STATES PATENT OFFICE.

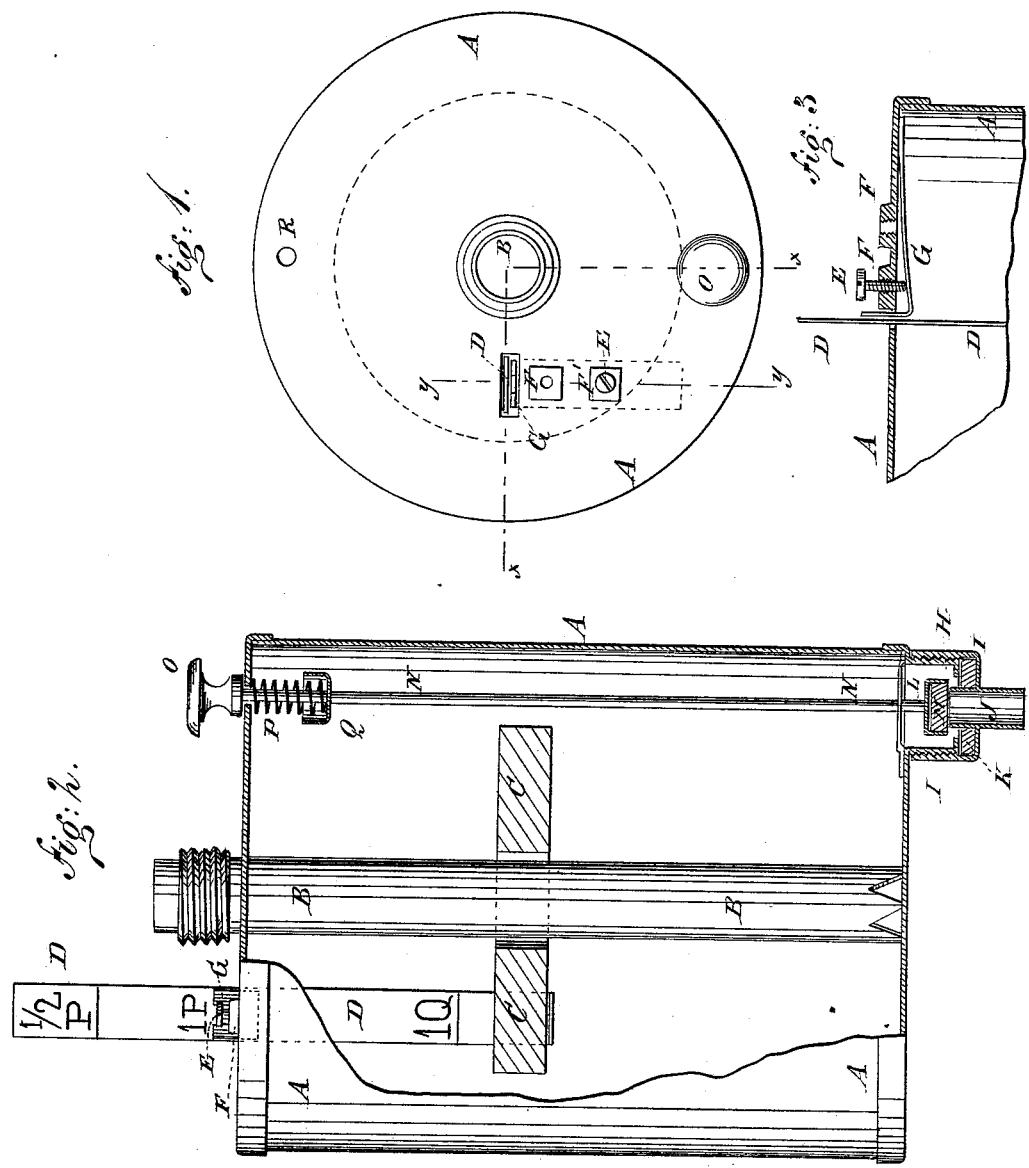

THOMAS F. LONGAKER, OF WEST PHILADELPHIA, PENNSYLVANIA.

ADJUSTABLE GAGE FOR LIQUID-MEASURES.

SPECIFICATION forming part of Letters Patent No. 229,431, dated June 29, 1880.

Application filed November 7, 1879.

*To all whom it may concern:*

Be it known that I, THOMAS F. LONGAKER, of West Philadelphia, in the county of Philadelphia and State of Pennsylvania, have invented a new and useful Improvement in Measuring Attachments for Faucets, of which the following is a specification.

Figure 1 is a plan view of my improvement. Fig. 2 is a side elevation, partly in section, through the line $x\,x$, Fig. 1. Fig. 3 is a sectional elevation of the upper part of the attachment, taken through the line $y\,y$, Fig. 1.

Similar letters of reference indicate corresponding parts.

The object of this invention is to improve the construction of the measuring attachments for faucets for which Letters Patent No. 211,577 were granted to me January 21, 1879, so as to make them more convenient and reliable in use.

The invention consists in providing the measuring attachment with a device for adjusting the attachment for measuring liquids of different specific gravities, and also in so constructing the discharge-valve that the packing may be renewed by unscrewing the valve-seat, as will be hereinafter fully described.

A represents the case or shell of the attachment, which is made cylindrical and with closed bottom and top, and may be of any desired capacity. B is a tube which passes down through and is secured in a hole in the center of the top of the case A. The lower end of the inlet-tube B extends to the bottom of the case A, is notched so that the liquid can escape freely, and is secured to the said bottom by solder. The upper end of the tube B projects above the top of the case A, and is provided with a screw-thread or coupling for securing it to the faucet.

Within the case A and around the inlet-tube B is placed a float, C, to which is attached a strip, D, of steel or other suitable material.

The strip D passes up through a slot in the top of the case A, and has a scale of division-marks formed upon it representing quarts, pints, and fractions of a pint or other quantities, according to the capacity of the case A. With this construction, when the faucet is opened and the liquid flows through the tube B into the case A, the float C rises, and as soon as the division-mark of the scale D that indicates the quantity to be drawn comes into view the faucet is closed and the liquid is drawn out of the case A into a bottle, can, or other receiver.

A ventilating-hole, R, is formed in the top of the case A to allow the air to pass in and out freely, and thus prevent the movement of the float C from being impeded by compressed air or the tendency to form a vacuum. If all liquids had the same specific gravity, the attachment could be used for drawing all kinds of liquids; but as liquids have different specific gravities the attachment must be provided with an adjusting device to avoid the necessity of making different attachments for each kind of liquid. For this purpose a screw, E, is screwed into a nut, F, secured to the top of the case A in front of the scale D, which may be turned up when the attachment is to be used for drawing a lighter liquid, and turned down when the attachment is to be used for drawing a heavier liquid.

As the screw E cannot be placed close to the scale D, a spring, G, may be used in connection with the screw E. In this case the rear end of the spring G is soldered to the under side of the top of the case A in such a position that the spring G may be beneath the screw E. The forward end of the spring G is bent upward at right angles, and passes up through the slot in the top of the case A along the forward side of the scale D, so that the upper or index end of the spring G may be lowered and raised by turning the screw E down and up. In this case the nut F' and screw E may be placed farther from the scale D than when the screw E serves as an index, as indicated by the two nuts F F' in Figs. 1 and 3.

The liquid is drawn off through a discharge-pipe, H, secured in a hole in the bottom of the case A, which discharge-pipe is closed by a peculiarly-constructed valve.

Upon the discharge-pipe H is screwed a cap, I, in a hole in the center of which is secured a short tube, J. In the cap I, around the upper end of the tube J, is placed a packing, K, of cork or other suitable material, which packing is pressed against the lower end of the discharge-pipe H by screwing up the cap I.

L is the valve, which is made cup-shaped, and has a packing, M, of cork or other suitable material, placed in its cavity. The packing M rests upon the upper end of the tube J when the valve is closed, as shown in Fig. 2.

To the valve L is attached the lower end of the valve-stem N, which passes up through a hole in the top of the case A, and has a knob, O, attached to its upper end for convenience in operating it.

The valve L is held down upon its seat J by the pressure of a coiled spring, P, placed upon the upper part of the valve-stem N. The upper end of the spring P rests against the top of the case A, and its lower end rests against a cup, disk, or shoulder, Q, attached to or formed upon the valve-stem N.

With this construction there will be no leakage or dripping around the valve, and when the packing M becomes worn it can be removed and replaced by a new one by simply unscrewing the cap I.

Having thus described my invention, what I claim as new, and desire to secure by Letters Patent, is—

1. In a measuring attachment for faucets, the combination, with the case A, the float-scale D, and the adjustable screw and nut E F, of the adjustable index-spring G, substantially as herein shown and described, to bring the adjustable index close to the float-scale D, as set forth.

2. In a measuring attachment for faucets, the combination, with the discharge-tube H, of the screw-cap I, provided with a pipe, J, and a packing, K, the cup-valve L, provided with a packing, M, and the valve-stem N and its spring P, substantially as herein shown and described, to allow the packing M to be renewed by removing the valve-seat, as set forth.

THOMAS F. LONGAKER.

Witnesses:
PERCY P. McGRATH,
ISAAC H. JONES.